(12) United States Patent
Jordan et al.

(10) Patent No.: US 9,155,245 B2
(45) Date of Patent: Oct. 13, 2015

(54) WORK VEHICLE

(71) Applicant: KUBOTA CORPORATION, Osaka (JP)

(72) Inventors: Barry Jordan, Toccoa, GA (US); Takeshi Komorida, Duluth, GA (US); Maxwell Reichard, Gainesville, GA (US)

(73) Assignee: KUBOTA CORPORATION, Osaka (JP)

( * ) Notice: Subject to any disclaimer, the term of this patent is extended or adjusted under 35 U.S.C. 154(b) by 121 days.

(21) Appl. No.: 14/018,944

(22) Filed: Sep. 5, 2013

(65) Prior Publication Data

US 2015/0059309 A1 Mar. 5, 2015

(51) Int. Cl.
*A01D 34/76* (2006.01)
*A01D 34/81* (2006.01)

(52) U.S. Cl.
CPC ............... *A01D 34/81* (2013.01); *A01D 34/76* (2013.01)

(58) Field of Classification Search
CPC ... A01D 34/76; A01D 34/68; A01D 34/6806; A01D 69/00; A01D 69/06; A01D 2101/00; A01D 34/81

USPC ................. 56/11.6, 14.7, 16.7, 17.5
See application file for complete search history.

(56) References Cited

U.S. PATENT DOCUMENTS

| | | | | |
|---|---|---|---|---|
| 5,155,985 A | * | 10/1992 | Oshima et al. | 56/10.8 |
| 5,826,414 A | * | 10/1998 | Lenczuk | 56/14.7 |
| 7,427,247 B2 | | 9/2008 | Melone | |
| 7,596,934 B2 | * | 10/2009 | Waesche et al. | 56/11.9 |
| 7,610,986 B2 | | 11/2009 | Ohashi | |
| 7,798,259 B2 | * | 9/2010 | Iida et al. | 180/6.2 |
| 2013/0047568 A1 | | 2/2013 | Yamada et al. | |

* cited by examiner

*Primary Examiner* — Robert Pezzuto
(74) *Attorney, Agent, or Firm* — Greenblum & Bernstein, P.L.C.

(57) ABSTRACT

There is provided a work vehicle including: an engine in which a pulley for transmitting power is fitted to an output shaft disposed in such a manner as to project downward from a bottom; and a mount surface at which an opening, into which the pulley can be inserted, is formed, and further, on which the engine is mounted in the state in which the pulley is inserted into the opening from above. The work vehicle is further provided with a fixed plate that is fixed to the bottom of the engine and joined to the mount surface so as to fix the engine onto the mount surface. The output shaft is inserted through the fixed plate, and further, the fixed plate is interposed between the bottom of the engine and the pulley.

20 Claims, 17 Drawing Sheets

WORK VEHICLE

BACKGROUND OF THE INVENTION (1) Field of the Invention

The present invention relates to a work vehicle provided with an engine that is mounted on a mount surface and has an output shaft projecting downward from the mount surface.

(2) Description of Related Art

United States Patent Application Publication No. 2013/0047568 discloses a work vehicle provided with a pair of right and left main frames, a prime motor frame connected to the rear ends of the pair of right and left main frames, and an engine mounted on the prime motor frame. The prime motor frame has a through hole formed thereat. The engine is disposed such that the output shaft of the engine projects downward of the prime motor frame through the through hole. An output pulley is disposed at the lower end of the output shaft (i.e., a portion projecting downward through the through hole) from the lower portion of the prime motor frame. The power of the engine can be taken from the output pulley via a belt.

In the above-described conventional work vehicle, the through hole is formed to such an extent as to enable only the output shaft to pass therethrough. As a consequence, when the work vehicle is assembled, the output shaft is first inserted into the through hole, and thus, the engine is disposed in the prime motor frame. Next, the output pulley is fixed at the lower end of the output shaft at the lower portion of the prime motor frame. In this manner, the number of man-hours for fixing the engine to the prime motor frame is large with complicated work in the conventional work vehicle.

Moreover, when the engine is detached from the prime motor frame, the output pulley is first detached from the output shaft. Next, the engine is lifted upward, and thus, it is detached from the prime motor frame. In this manner, the conventional work vehicle needs a process in which the output pulley is detached from the output shaft. Consequently, the number of man-hours for detaching the engine from the prime motor frame also is large with complicated work in the conventional work vehicle. Thus, the maintenance for the engine or the work vehicle becomes difficult.

SUMMARY OF THE INVENTION

An object of the present invention is to provide a work vehicle, in which an engine can be readily attached and detached.

In order to achieve the above-described object, a work vehicle according to the present invention includes: an engine in which a plurality of pulleys for transmitting power are fitted to an output shaft disposed in such a manner as to project downward from a bottom; a mount surface at which an opening, into which the plurality of pulleys can be inserted, is formed, and further, on which the engine is mounted in the state in which the plurality of pulleys are inserted into the opening from above; a mower unit disposed forward of the engine; and a rotatable drive wheel; wherein the power of the engine is transmitted to the mower unit via at least one of the plurality of pulleys, and further, is transmitted to the drive wheel via at least one of the plurality of pulleys.

With this configuration, while the pulley is disposed at the output shaft of the engine, the engine can be mounted on the mount surface or demounted therefrom. Hence, it is possible to readily attach and detach the engine.

DETAILED DESCRIPTION OF PREFERRED EMBODIMENTS

Figure 1:
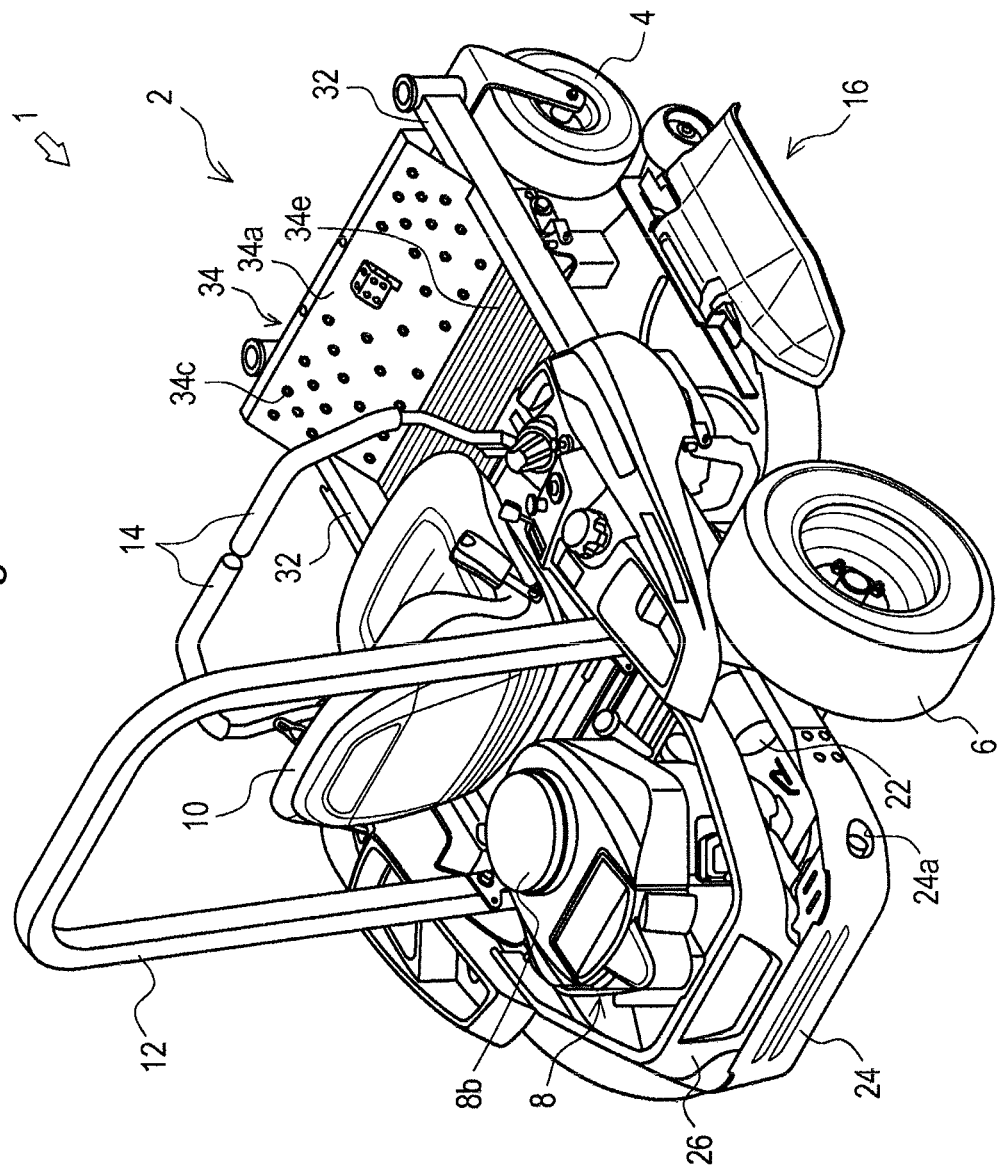
FIG. 1 is a perspective view showing a work vehicle in one preferred embodiment of the present invention, as viewed from the upward and rearward.
Figure 2:
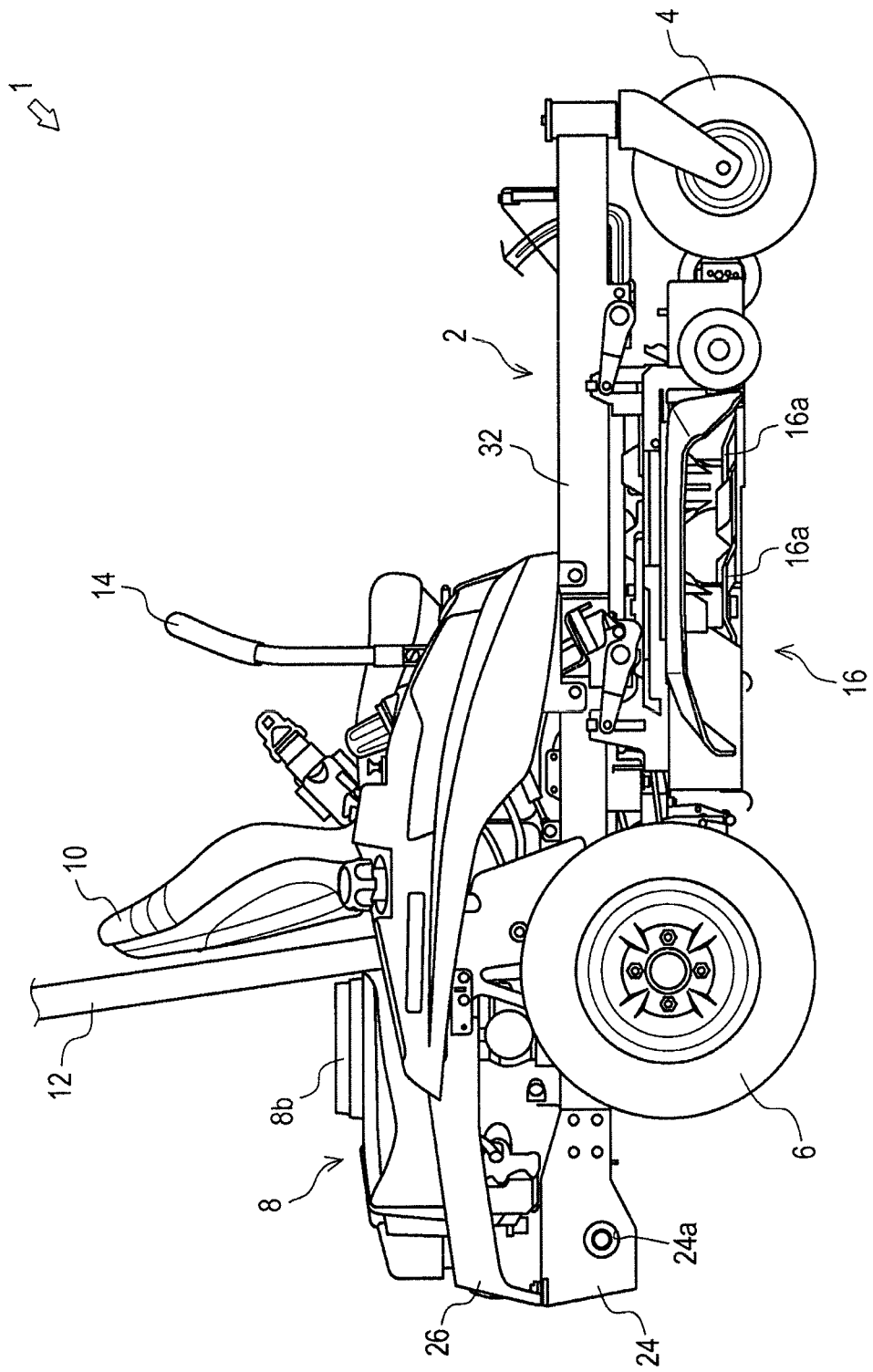
FIG. 2 is a side view showing the work vehicle in the preferred embodiment of the present invention.
Figure 3:
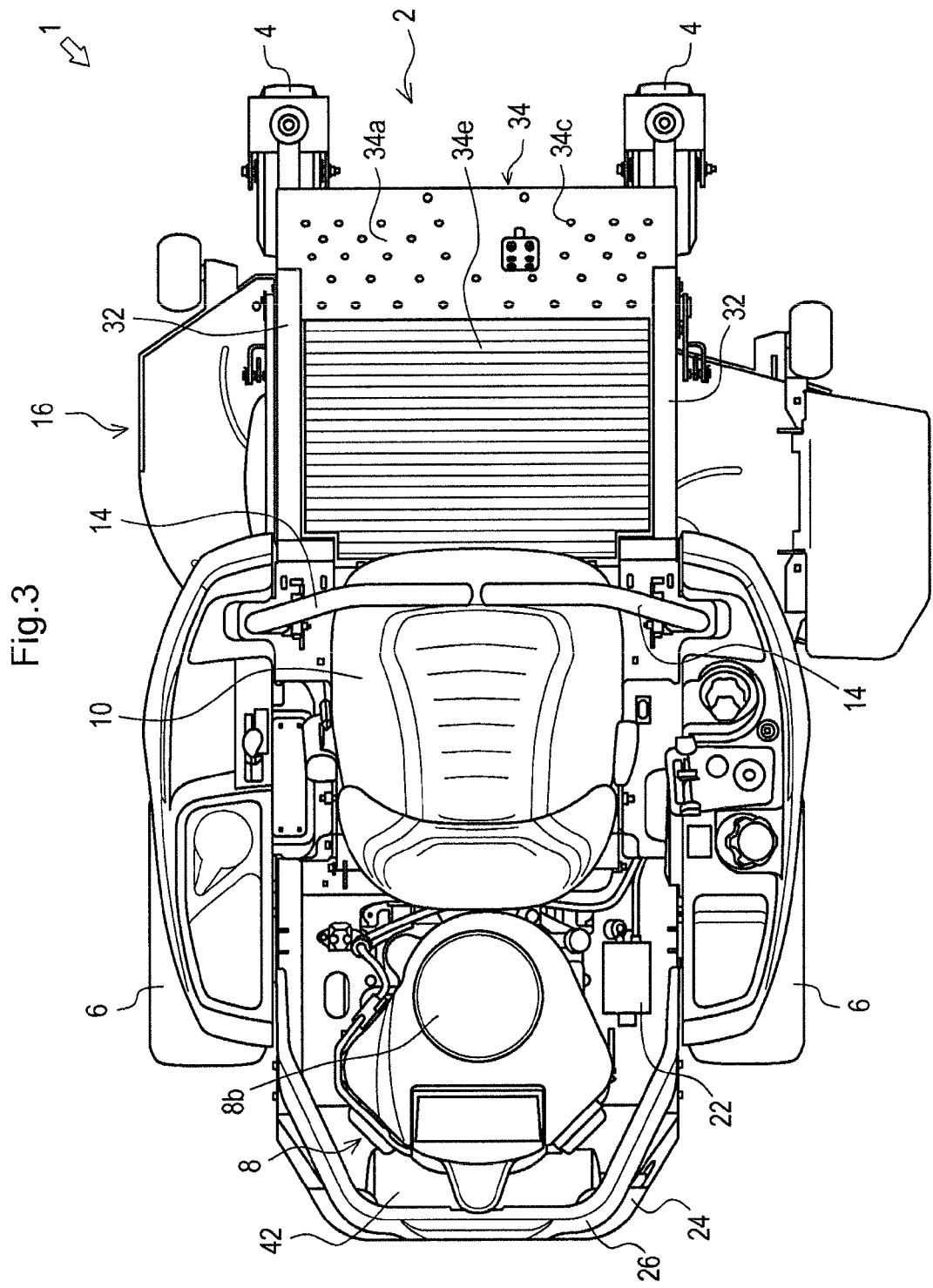
FIG. 3 is a plan view showing the work vehicle in the preferred embodiment of the present invention.

Hereinafter, preferred embodiments of the present invention will be described with reference to the drawings.

A work vehicle 1 exemplifying a work vehicle according to the present invention will be explained below. Here, members unrequired for the explanation will be appropriately omitted in the drawings.

First, the overall configuration of the work vehicle 1 will be described with reference to FIGS. 1 to 4.

The work vehicle 1 is a so-called zero turn mower, that is, a ride-on mower. The work vehicle 1 is provided with a machine frame 2, front wheels 4, drive wheels 6, an engine 8, a driver's seat 10, a ROPS (abbreviating a roll-over protective structure) 12, traveling levers 14, a mower unit 16, transmissions 18, and the like.

The machine frame 2 is a principal constituent element for the work vehicle 1. The front section of the machine frame 2 is supported by the pair of right and left caster-type front wheels 4. The rear section of the machine frame 2 is supported by the pair of right and left drive wheels 6 via the pair of right and left transmissions 18, respectively. In the present preferred embodiment, the transmission 18 is exemplified by an HST (abbreviating a hydrostatic transmission). On the rear section of the machine frame 2 is mounted the engine 8. In front of the engine 8 is disposed the driver's seat 10, on which a driver sits. Behind the driver's seat 10 is disposed the ROPS 12 for protecting the driver. On the right and left sides of the driver's seat 10 are disposed the pair of right and left traveling levers 14. At the lower section of the machine frame 2 is disposed the mower unit 16 via a link mechanism, not shown.

In the work vehicle 1 such configured as described above, the power of the engine 8 is transmitted to the pair of right and left drive wheels 6 via the pair of right and left transmissions 18, respectively. The driver can operate the pair of right and left traveling levers 14, to independently change the speeds of the right and left transmissions 18, respectively. Furthermore, the driver can independently change the speeds of the right and left transmissions 18, to independently and arbitrarily drive the right and left drive wheels 6. In other words, the driver can operate the traveling levers 14, to arbitrarily travel the work vehicle 1 forward or rearward or turn it.

Additionally, the power of the engine 8 is transmitted to the mower unit 16. The mower unit 16 can mow grass with the power transmitted from the engine 8.

Figure 5:
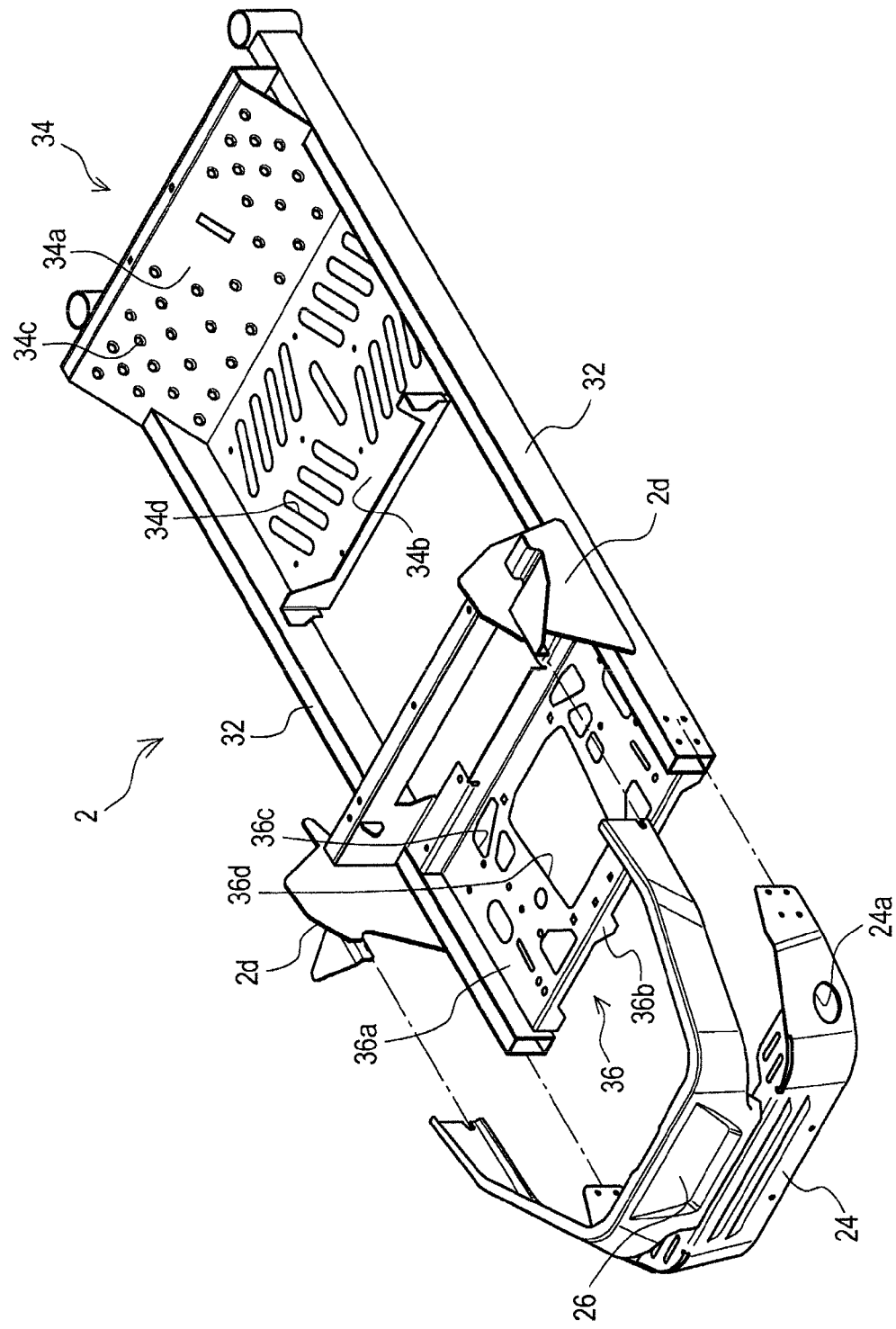
FIG. 5 is a perspective view showing a machine frame, as viewed from the upward and rearward.
Figure 6:
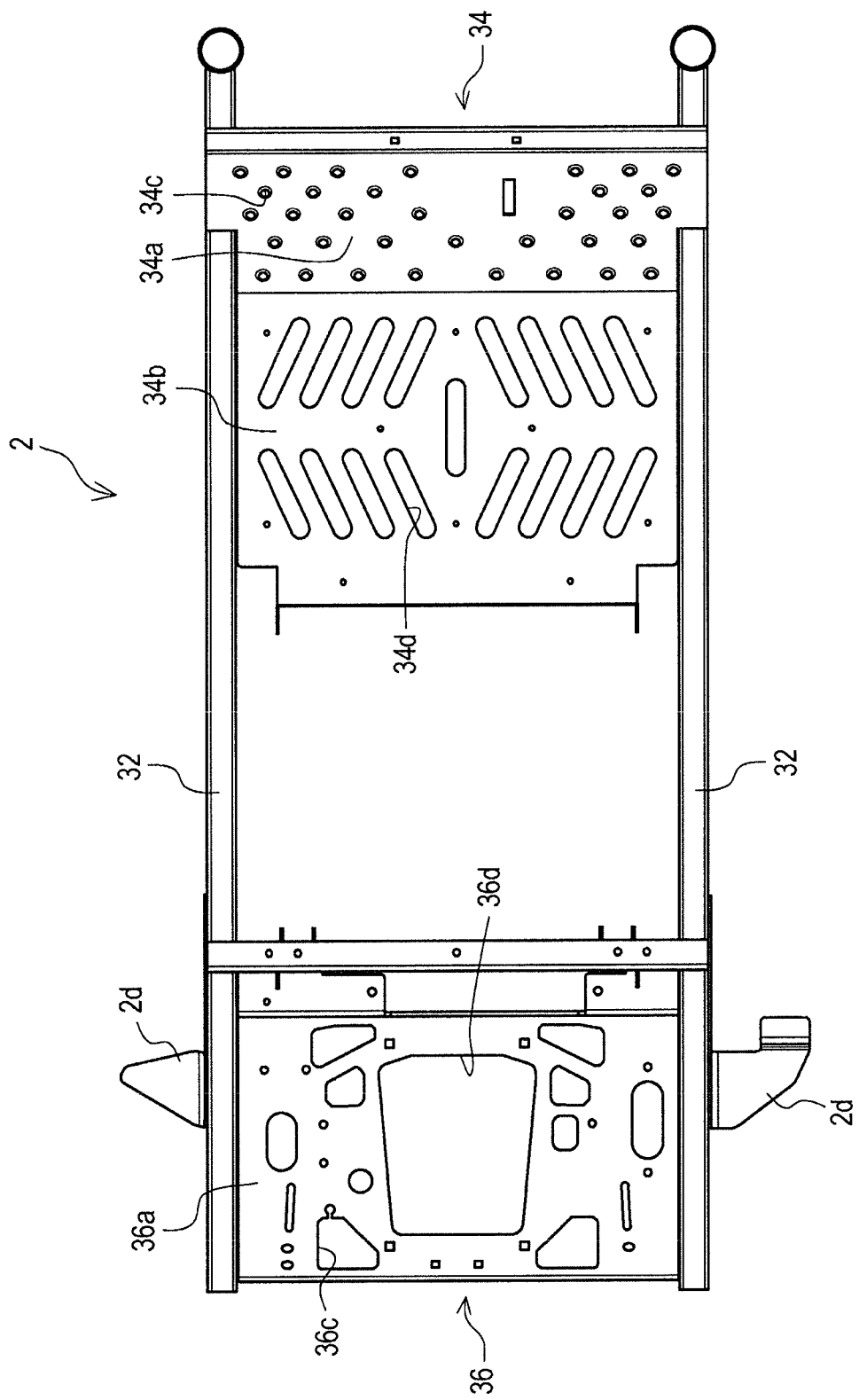
FIG. 6 is a plan view showing the machine frame.

Next, detailed explanation will be made on the machine frame 2 with reference to FIGS. 5 and 6.

The machine frame 2 is provided with a pair of right and left main frames 32, a boarding frame 34, a mount frame 36, and the like.

Each of the main frames 32 is constituted of a linear square pipe. The main frames 32 are laterally arranged while orienting lengthwise in a longitudinal direction.

The boarding frame 34 is a place on which the driver boards. The boarding frame 34 is formed by appropriately bending a plate-like member. The boarding frame 34 includes an inclined surface 34a inclined forward and a horizontal surface 34b that is continuous to the rear end of the inclined surface 34a and parallel (i.e., horizontal) to the longitudinal direction of the main frame 32. Both of right and left ends of the boarding frame 34 are welded near the fore ends of the pair of right and left main frames 32, respectively. In this manner, both of the right and left ends of the boarding frame 34 connect the fore portions of the pair of right and left main frames 32 to each other. At the boarding frame 34 are formed a plurality of projections 34c and a plurality of through holes 34d.

The plurality of projections 34c are formed at the inclined surface 34a of the boarding frame 34. The formation of the projections 34c at the inclined surface 34a can prevent the driver boarding on the boarding frame 34 from slipping.

The plurality of through holes 34d are formed at the horizontal surface 34b of the boarding frame 34. The formation of the through holes 34d at the horizontal surface 34b can reduce the weight of the boarding frame 34. On the horizontal surface 34b is mounted a rubber mat 34e (see FIG. 3).

The mount frame 36 is a place on which the engine 8 and the like are mounted. The mount frame 36 is formed by appropriately bending a plate-like member. The mount frame 36 includes a mount surface 36a parallel to the longitudinal direction of the main frame 32 and a rear end 36b continuous to the rear end of the mount surface 36a and bent downward. Both of right and left ends of the mount frame 36 are welded near both of the rear ends of the right and left main frames 32, respectively. In this manner, the mount frame 36 connects the rear portions of the right and left main frames 32 to each other. The mount frame 36 includes a plurality of through holes 36c and an opening 36d.

The through holes 36c are formed at the mount surface 36a of the mount frame 36. The formation of the plurality of through holes 36c at the mount surface 36a can reduce the weight of the mount frame 36.

The opening 36d is formed at the center of the mount surface 36a in the lateral direction. The opening 36d is formed through the mount surface 36a in a vertical direction. The opening 36d is formed into a substantially rectangular shape, as viewed on a plane. The opening 36d is formed in a size greater than a first pulley 46, a second pulley 48, and an electromagnetic clutch 50, described later, as viewed on the plane. The opening 36d is formed in a size smaller than a fixed plate 44, described later, and the engine 8, as viewed on the plane.

Next, a description will be given of the configuration of members to be disposed at the rear portion of the machine frame 2 with reference to FIGS. 4, 5, and 7 to 12.

At the rear portion of the machine frame 2 are provided the engine 8, a fuel tank 20, a canister 22, the pair of right and left transmissions 18, a muffler cover 24, an engine cover 26, and the like. Explanation will be made below on these members in order.

The engine 8 shown in FIGS. 7 to 10 is an air-cooled gasoline engine. The engine 8 includes an output shaft 8a and a fan 8b.

The output shaft 8a is adapted to take power from the engine 8. The output shaft 8a is disposed in such a manner as to project downward from the bottom of the engine 8.

The fan 8b is adapted to cool the engine 8. The fan 8b is disposed at the upper portion of the engine 8. The fan 8b can send air downward to thus cool the engine 8.

The engine 8 includes a muffler 42, the fixed plate 44, the first pulley 46, the second pulley 48, the electromagnetic clutch 50, and the like. The first pulley 46 and the second pulley 48 exemplify a pulley according to the present invention.

The muffler 42 is connected to the engine 8, and further, is fixed to the engine 8. The muffler 42 is formed into a cylindrical shape. The muffler 42 is laterally oriented in its longitudinal direction. The muffler 42 is disposed downward and rearward of the engine 8 in such a manner as to partly overlap the engine 8, as viewed on the plane.

The fixed plate 44 is designed to securely mount the engine 8 on the mount frame 36. The fixed plate 44 is a plate-like member disposed in parallel to the mount surface 36a of the mount frame 36. The fixed plate 44 is formed into a substantially rectangular shape, as viewed on the plane. The fixed plate 44 is formed in the next larger size than the opening 36d of the mount frame 36, as viewed on the plane. The fixed plate 44 includes an opening 44a and a pair of front and rear through holes 44b.

The opening 44a is formed at the center of the fixed plate 44. The opening 44a is formed vertically through the fixed plate 44. The opening 44a is formed into a circular shape, as viewed on the plane. The opening 44a is formed into a size larger than the output shaft 8a of the engine 8, as viewed on the plane. In the meantime, the opening 44a is formed into a size smaller than the first pulley 46, the second pulley 48, and the electromagnetic clutch 50, described later, as viewed on the plane.

The through holes 44b are formed forward and rearward of the opening 44a. The formation of the through holes 44b at the fixed plate 44 can reduce the weight of the fixed plate 44.

The fixed plate 44 such configured as described above is attached onto the bottom of the engine 8. When the fixed plate 44 is attached to the engine 8, the output shaft 8a of the engine 8 is inserted into the opening 44a of the fixed plate 44. The output shaft 8a of the engine 8 projects downward of the fixed plate 44.

The first pulley 46 is adapted to transmit the power of the engine 8 to the transmissions 18. The first pulley 46 is fitted around the output shaft 8a of the engine 8 right under the fixed plate 44.

The second pulley 48 is adapted to transmit the power of the engine 8 to the mower unit 16. The second pulley 48 is fitted around the output shaft 8a of the engine 8 under the first pulley 46 via the electromagnetic clutch 50.

The electromagnetic clutch 50 is designed to switch a state in which the power can be transmitted from the engine 8 to the second pulley 48 with a state in which it cannot be transmitted. The electromagnetic clutch 50 is fitted around the output shaft 8a of the engine 8 under the first pulley 46.

The engine 8 including the muffler 42, the fixed plate 44, the first pulley 46, the second pulley 48, and the electromagnetic clutch 50 is mounted on the mount surface 36a of the mount frame 36. When the engine 8 is mounted on the mount frame 36, the first pulley 46, the second pulley 48, and the electromagnetic clutch 50 are inserted into the opening 36d formed at the mount surface 36a. The first pulley 46, the second pulley 48, and the electromagnetic clutch 50 project downward of the mount surface 36a. The fixed plate 44 is formed in the next larger size than the opening 36d formed at the mount surface 36a, as viewed on the plane, and therefore, it is mounted on the mount surface 36a. Since the fixed plate 44 is fixed onto the mount surface 36a via bolts or the like, the engine 8 is securely mounted on the mount surface 36a. The muffler 42 is positioned at the same height as the main frames 32 of the machine frame 2 in the state in which the engine 8 is securely mounted on the mount surface 36a (see FIGS. 11 and 12).

Figure 11:
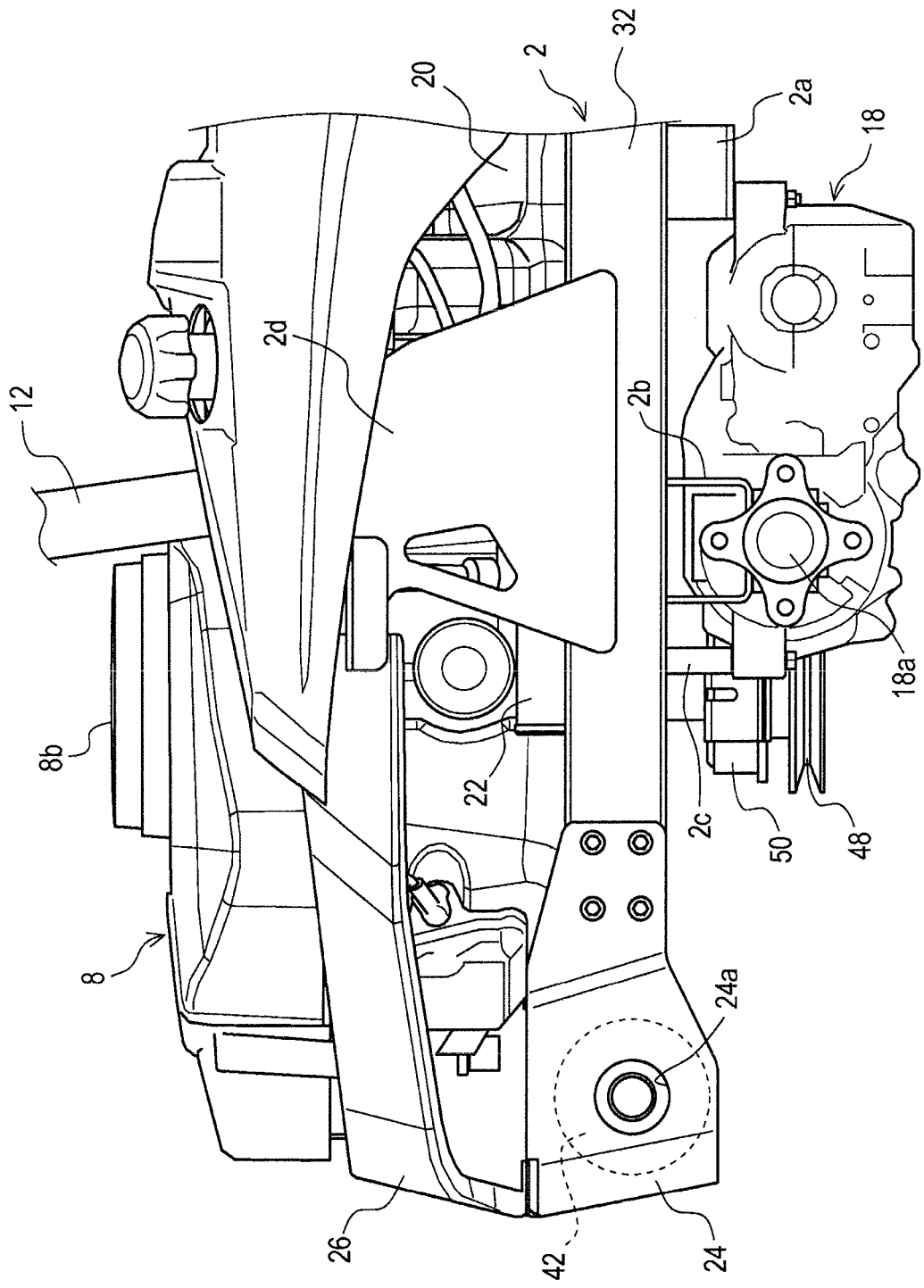
FIG. 11 is a side view showing the rear section of the work vehicle.
Figure 12:
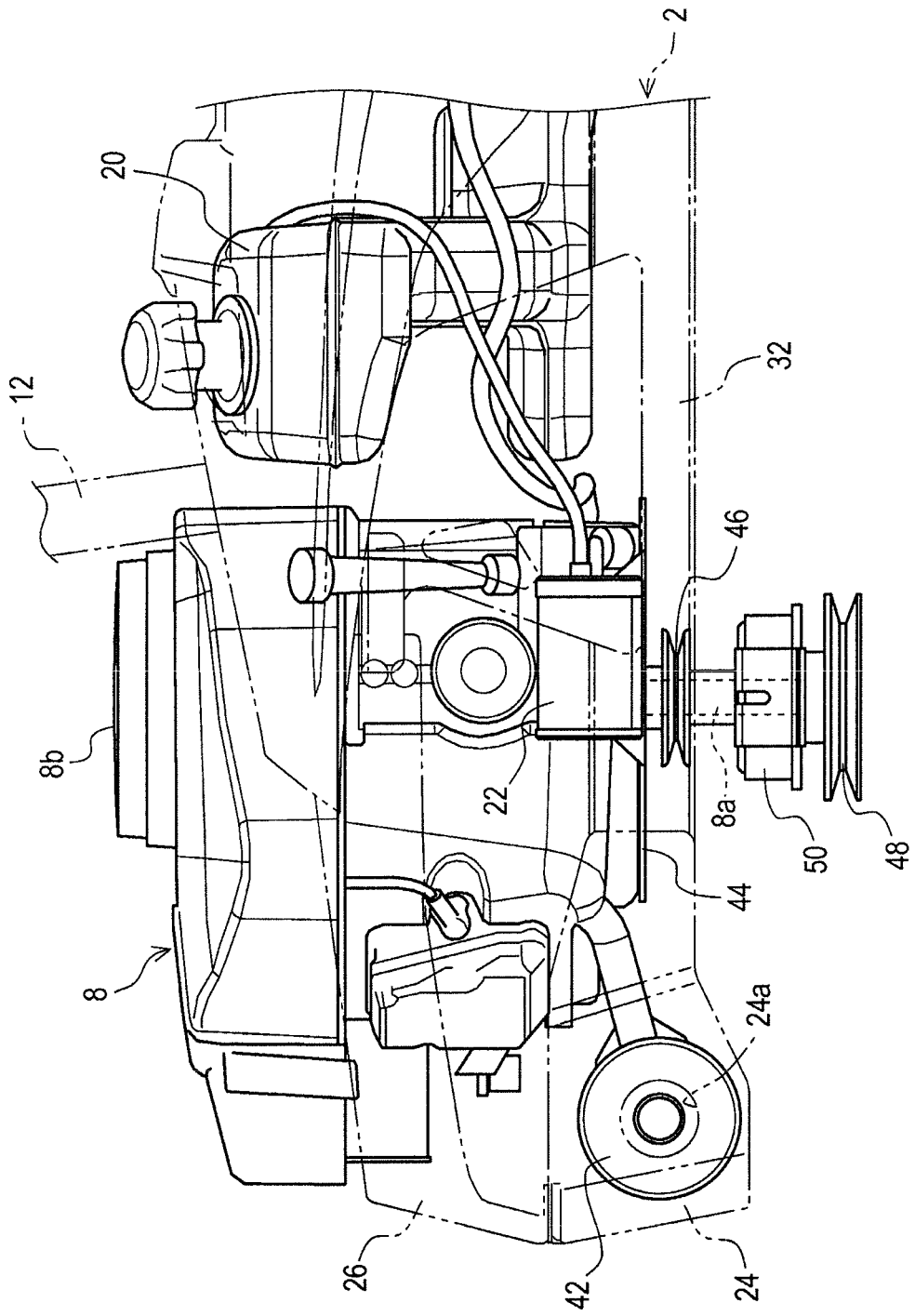
FIG. 12 is a side view showing the engine in the state in which it is fixed to the machine frame.

The fuel tank 20 shown in FIGS. 11 and 12 is adapted to reserve gasoline used for the engine 8 therein. The fuel tank 20 is disposed forward of the engine 8.

Figure 7:
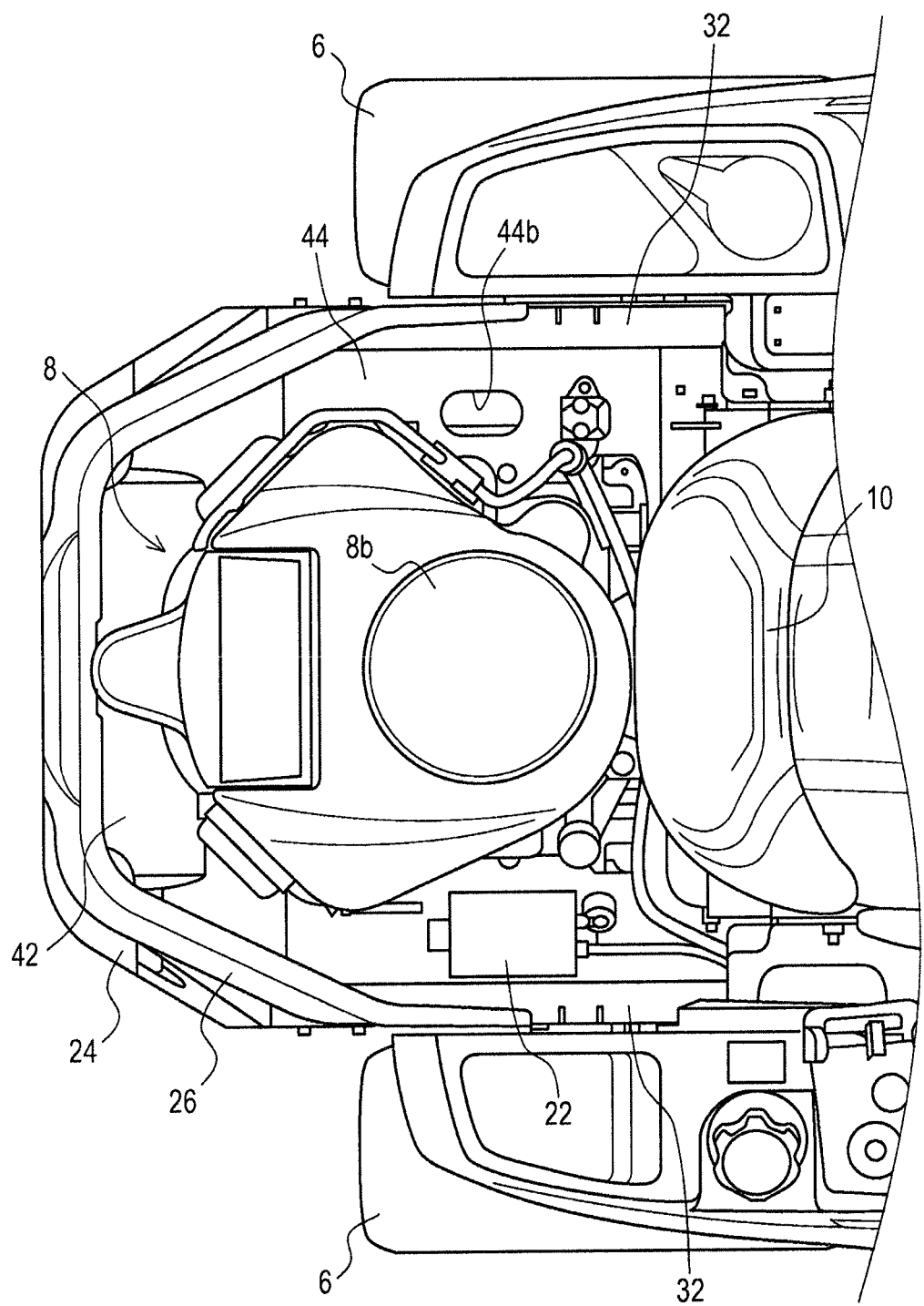
FIG. 7 is a plan view showing the rear section of the work vehicle.
Figure 8:
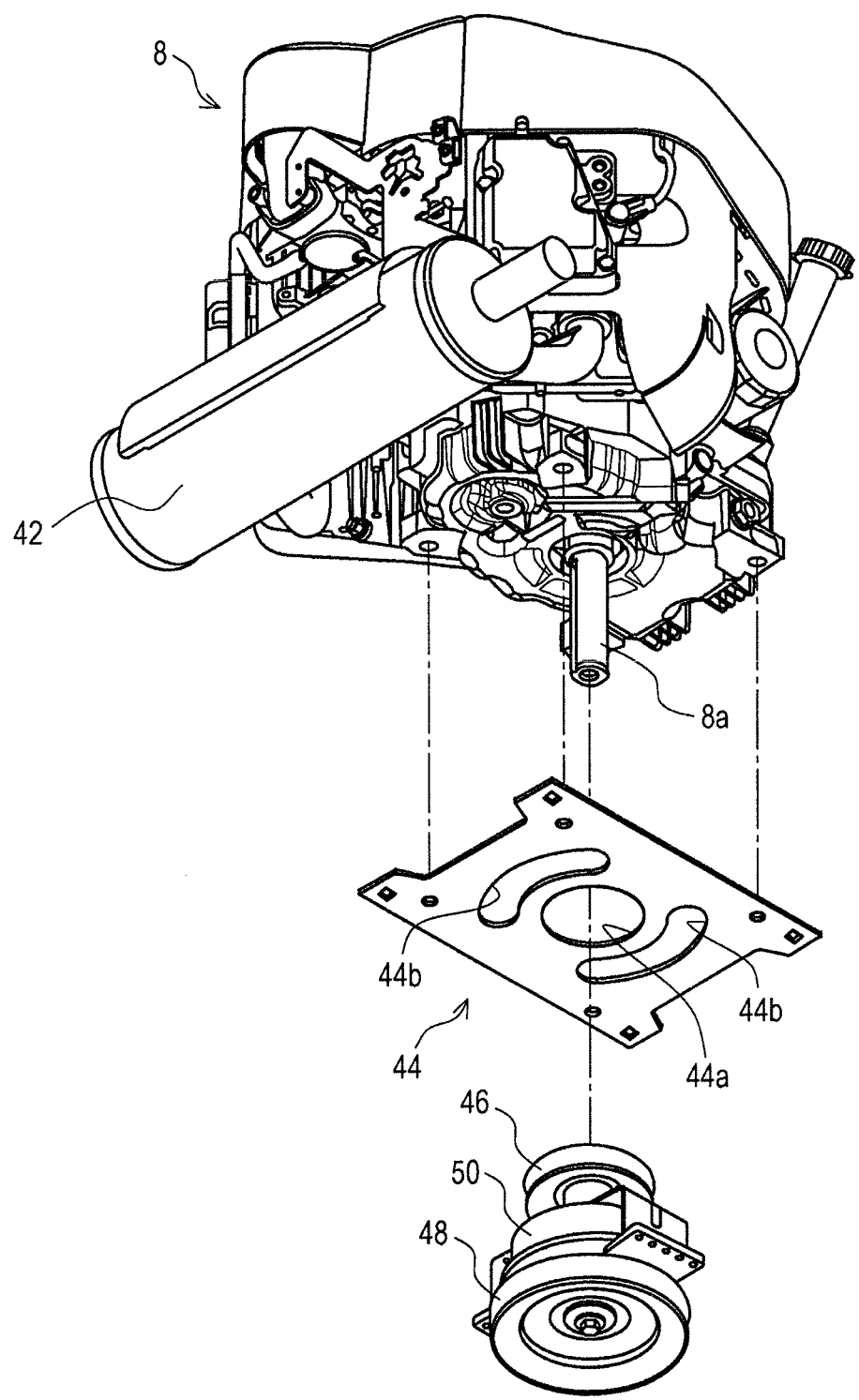
FIG. 8 is an exploded perspective view showing the engine, as viewed from the downward and rearward.

The canister 22 shown in FIGS. 7, 11, and 12 is designed to store gasoline steam generated in the fuel tank 20 without emission to the atmosphere. The canister 22 is formed into a cylindrical shape. The canister 22 is securely mounted on the mount surface 36a rightward of the engine 8. The canister 22 is connected to the fuel tank 20 and the engine 8 via hoses or the like. The canister 22 can adsorb and store the gasoline steam generated in the fuel tank 20. Moreover, the canister 22 supplies the steam of the stored gasoline to the engine 8 in the case where the engine 8 is operated, and then, burns it there.

Figure 4:
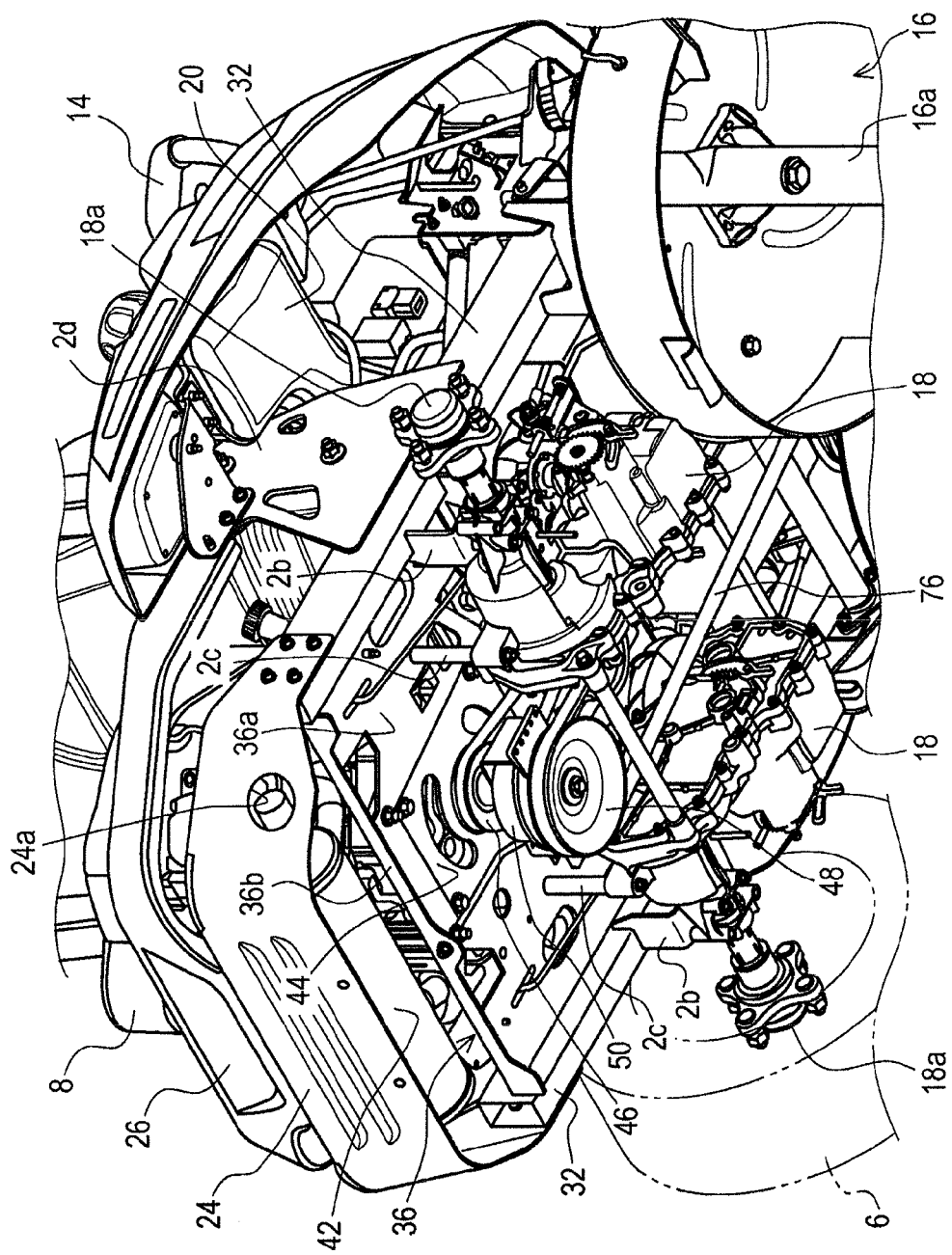
FIG. 4 is a perspective view showing the rear section of the work vehicle, as viewed from the downward and rearward.

The transmissions 18 shown in FIGS. 4 and 11 are adapted to vary the speed of the power transmitted to the drive wheels 6. The transmissions 18 are disposed under both of right and left ends of the mount frame 36, respectively. The fore end of the upper surface of the transmission 18 is fixed to the main frame 32 of the machine frame 2 via a front bracket 2a. The side of the upper surface of the transmission 18 is fixed to the main frame 32 of the machine frame 2 via a side bracket 2b. The rear end of the upper surface of the transmission 18 is fixed to the mount surface 36a of the mount frame 36 via a cylindrical spacer 2c. An axle 18a is disposed at the side surface of the transmission 18 in such a manner as to project therefrom. The axle 18a is rotated by the power transmitted from the engine 8. To the end of the axle 18a is fixed the drive wheel 6.

The muffler cover 24 shown in FIGS. 4, 5, 11, and 12 is designed to cover the muffler 42. The muffler cover 24 is formed by bending a plate-like member into a substantially U shape, as viewed on the plane. Both ends of the muffler cover 24 are fixed to the rear ends of the right and left main frames 32, respectively. The muffler cover 24 is disposed rearward of the rear ends of the main frames 32. The muffler cover 24 is positioned at the same height as the main frame 32. The muffler cover 24 covers the muffler 42 sideways (both of right and left sides and the rear portion). At the right surface of the muffler cover 24 is formed an opening 24a laterally penetrating the muffler cover 24. The opening 24a is formed at a position facing an exhaust port of the muffler 42.

The engine cover 26 is adapted to cover the engine 8. The engine cover 26 is made of a resin. The engine cover 26 is formed into a substantially U shape, as viewed on the plane. The engine cover 26 is disposed over the muffler cover 24. Both ends of the engine cover 26 are fixed to the right and left main frames 32 via upper brackets 2d, respectively. The rear end of the engine cover 26 is fixed to the rear end of the muffler cover 24. The engine cover 26 covers the vertical middle portion of the engine 8 sideways (both of right and left sides and the rear portion).

Figure 13:
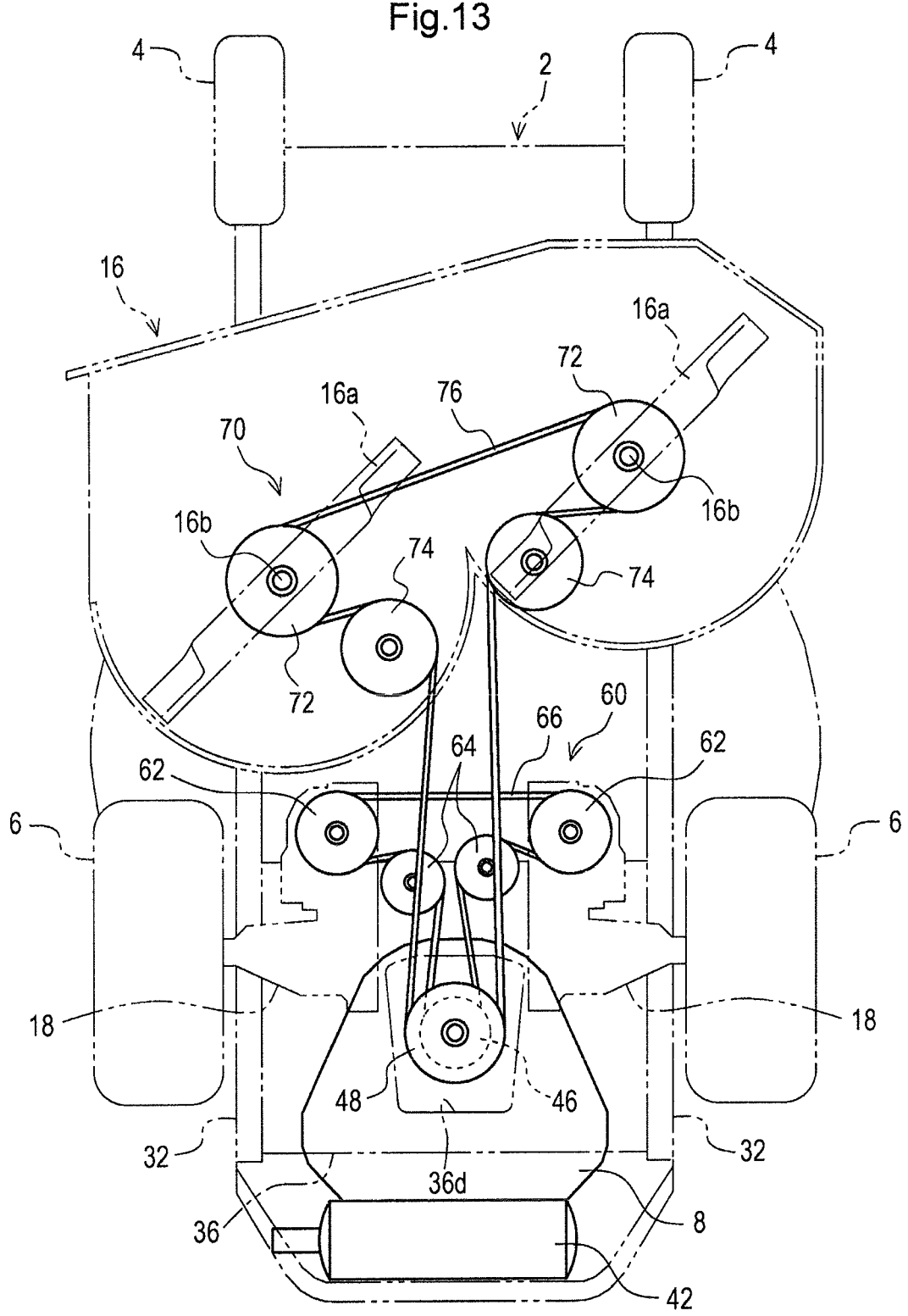
FIG. 13 is a bottom view schematically showing a mechanism for transmitting power.

Subsequently, a description will be given of a mechanism for transmitting the power from the engine 8 to the pair of right and left transmissions 18 and the mower unit 16 with reference to FIG. 13.

The work vehicle 1 is provided with a first power transmission mechanism 60 for transmitting the power from the engine 8 to the pair of right and left transmissions 18. The first power transmission mechanism 60 includes the first pulley 46, input pulleys 62, guide pulleys 64, a belt 66, and the like.

The input pulleys 62 are adapted to input the power into the transmissions 18. The input pulleys 62 are disposed at the front ends of the upper surfaces of the pair of right and left transmissions 18, respectively.

The guide pulleys 64 are adapted to guide the belt 66. The pair of right and left guide pulleys 64 are disposed. The guide pulleys 64 are disposed at the front portion of the engine 8 in such a manner as to be freely rotated under the machine frame 2.

The first pulley 46, the input pulleys 62, and the guide pulleys 64 are arranged at the same height as each other. The belt 66 is stretched across the first pulley 46, the input pulleys 62, and the guide pulleys 64.

The first pulley 46 is rotated by the power of the engine 8 in the first power transmission mechanism 60. The power of the first pulley 46 is transmitted to the input pulleys 62 via the belt 66, to thus rotate the input pulleys 62. The power of the input pulley 62 is input into the transmission 18 via an input shaft, not shown.

The work vehicle 1 is provided with a second power transmission mechanism 70 for transmitting the power from the engine 8 to the mower unit 16. The second power transmission mechanism 70 includes the second pulley 48, input pulleys 72, guide pulleys 74, a belt 76, and the like.

The input pulleys 72 are adapted to input the power into the mower unit 16. The input pulleys 72 are fixed to respective rotary shafts 16b of two blades 16a disposed in the mower unit 16, respectively.

The guide pulleys 74 are adapted to guide the belt 76. The pair of right and left guide pulleys 74 are disposed. The guide pulleys 74 are disposed at the front portion of the engine 8 in such a manner as to be freely rotated under the machine frame 2.

The second pulley 48, the input pulleys 72, and the guide pulleys 74 are arranged at the same height as each other at a position lower than the first power transmission mechanism 60. The belt 76 is stretched across the second pulley 48, the input pulleys 72, and the guide pulleys 74.

The second pulley 48 is rotated by the power of the engine 8 in the second power transmission mechanism 70. The power of the second pulley 48 is transmitted to the input pulleys 72 via the belt 76, to thus rotate the input pulleys 72. The power of the input pulleys 72 is transmitted to the blades 16a via the rotary shafts 16b. The transmitted power rotates the blades 16a. The mower unit 16 can mow grass by using the rotating blades 16a. When the electromagnetic clutch 50 is switched to the state in which the power cannot be transmitted from the engine 8 to the second pulley 48, the rotation of the blades 16a can be stopped.

Next, explanation will be made on a configuration for restricting the rotation of the electromagnetic clutch 50 with reference to FIGS. 14 to 17. The electromagnetic clutch 50 is disposed at the output shaft 8a of the engine 8. For this purpose, a clutch case 50a for covering the electromagnetic clutch 50 need be restricted from being rotated together with the output shaft 8a.

More specifically, the electromagnetic clutch 50 is provided with a first unit that is rotated together with the output shaft 8a all the time and a second unit that is or is not rotated together with the output shaft 8a according to the state of the electromagnetic clutch 50. The second unit of the electromagnetic clutch 50 is associated with the second pulley 48. The clutch case 50a covers the first unit and the second unit of the electromagnetic clutch 50. A wiring connected to the electromagnetic clutch 50 is connected to equipment outside of the clutch case 50a via the clutch case 50a. When the clutch case 50a is rotated, the wiring may be possibly broken. In view of this, the clutch case 50a need be restricted (i.e., fixed) from being rotated.

Figure 14:
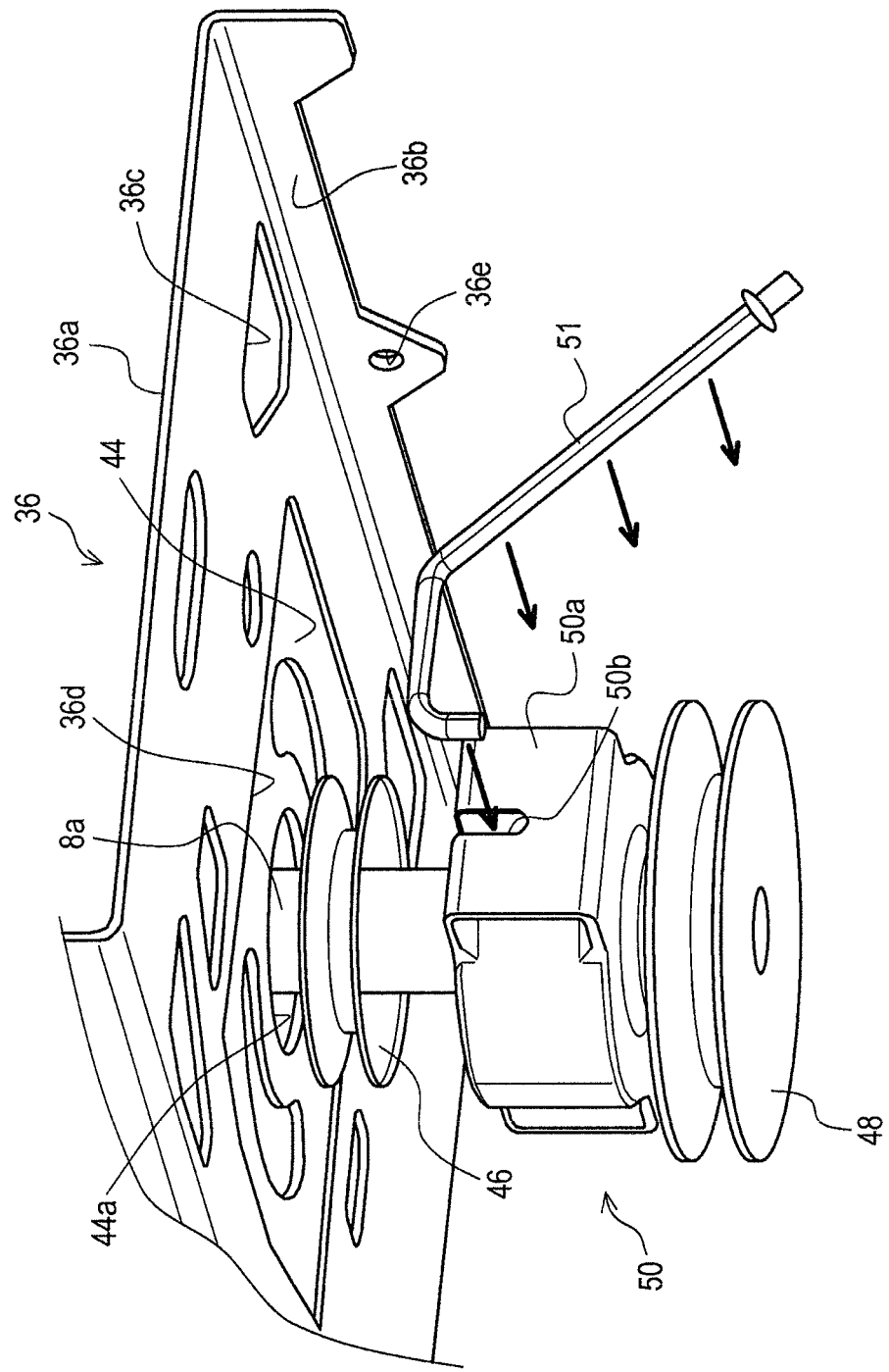
FIG. 14 is a perspective view showing a stopper for restricting the rotation of an electromagnetic clutch, as viewed from the downward and forward.

As shown in FIG. 14, a notch 50b is formed at the upper end of the left surface of the clutch case 50a covering the electromagnetic clutch 50. To the notch 50b is joined a stopper 51. The stopper 51 is formed by bending a rod-like member. The fore end of the stopper 51 is bent downward whereas the rear portion thereof is bent rearward and downward.

Figure 15:
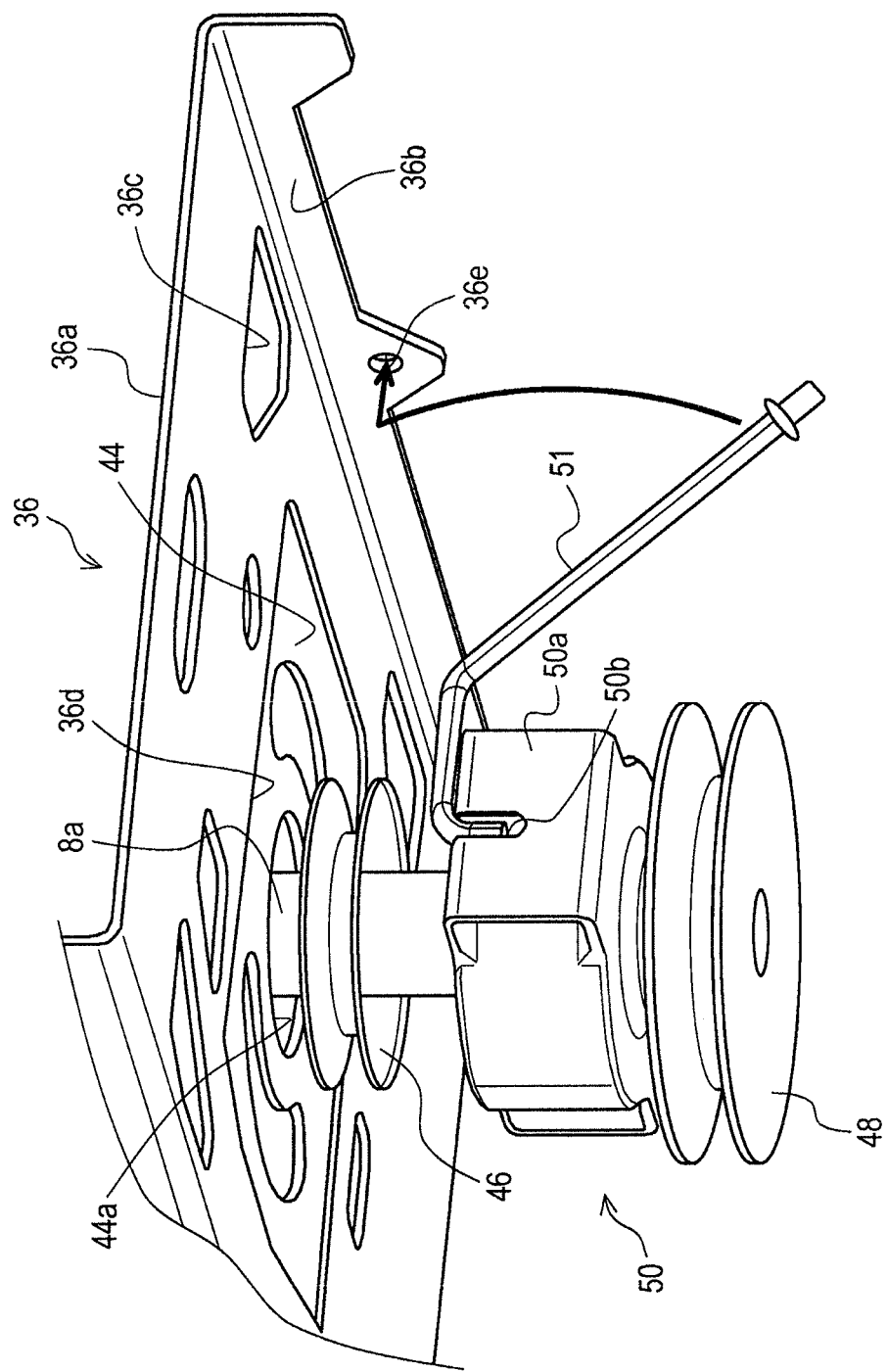
FIG. 15 is a perspective view showing the stopper hooked on the electromagnetic clutch, as viewed from the downward and forward.
Figure 16:
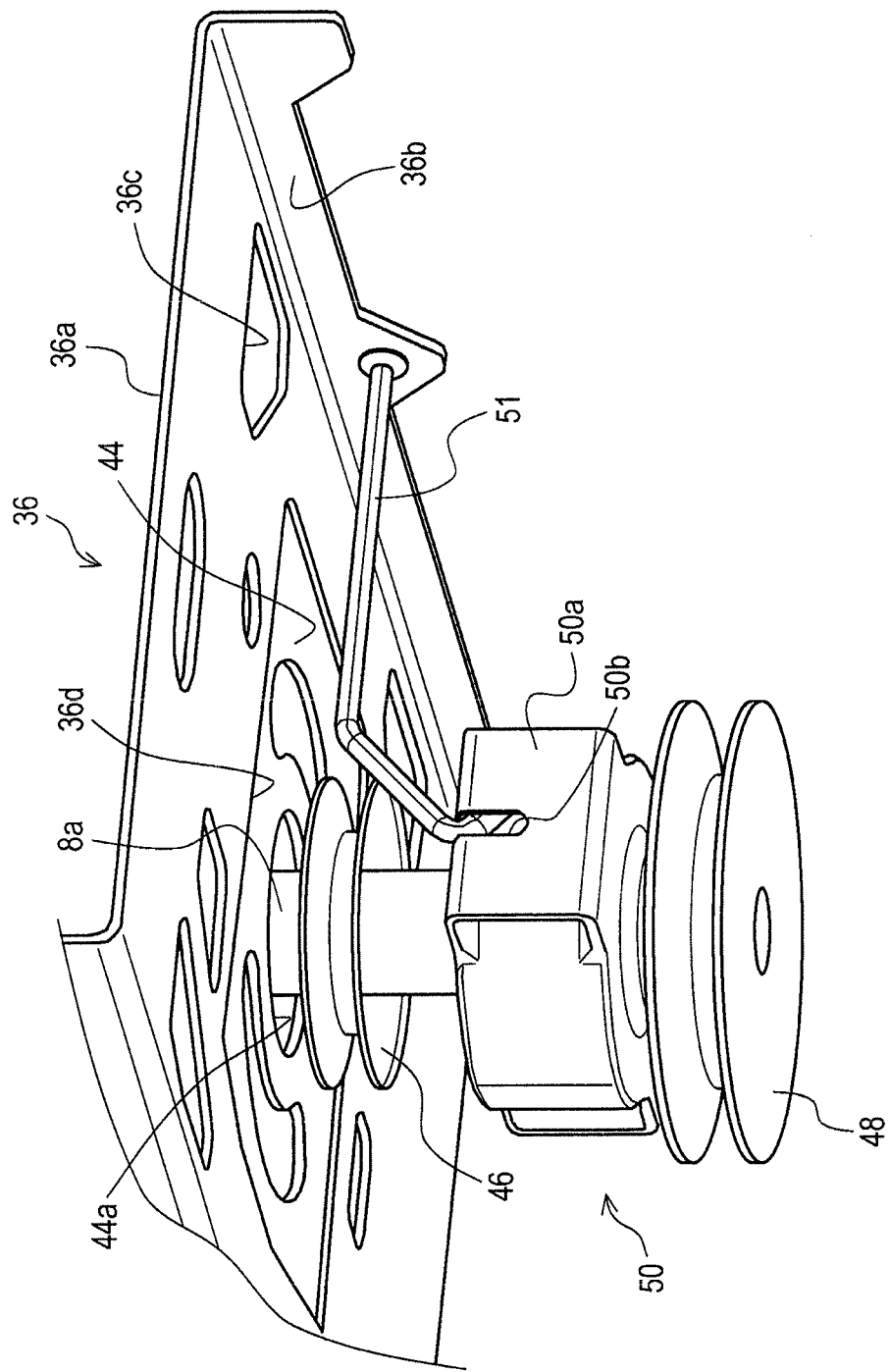
FIG. 16 is a perspective view showing the stopper joined to a mount frame, as viewed from the downward and forward.
Figure 17:
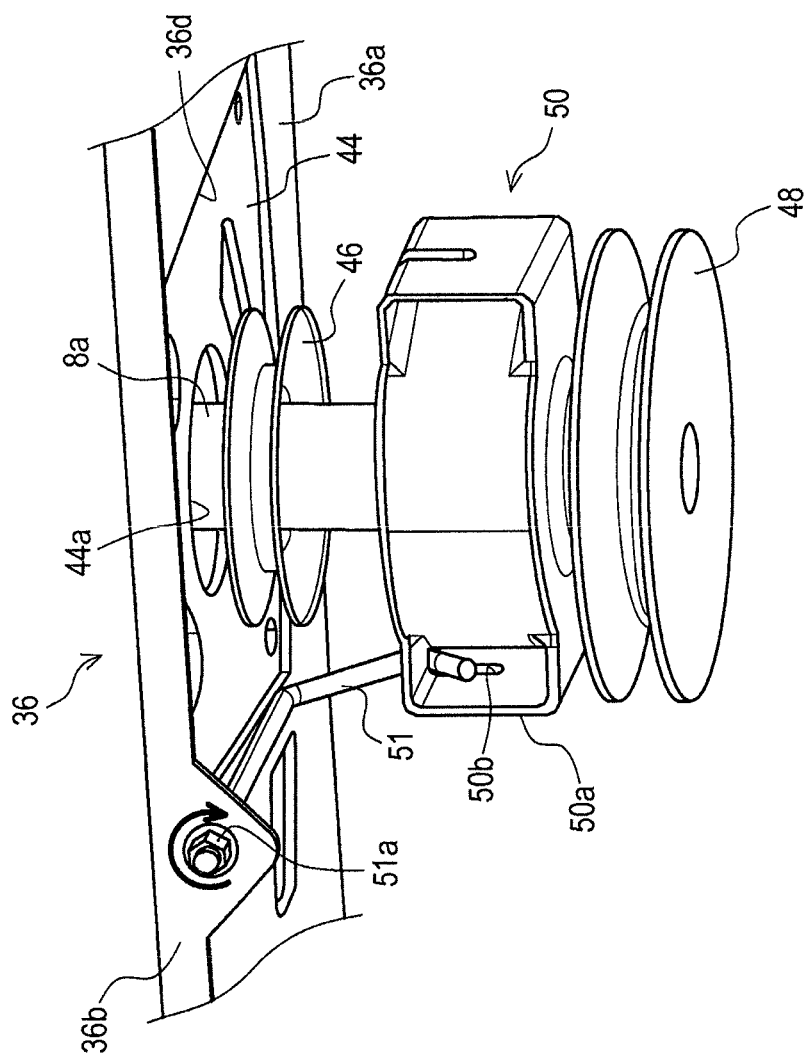
FIG. 17 is a perspective view showing a nut tightened to the stopper, as viewed from the downward and rearward.

The fore end of the stopper 51 is hooked on the notch 50b on the left side of the electromagnetic clutch 50 (see FIGS. 14 and 15). Thereafter, the rear end of the stopper 51 is lifted upward, and then, is inserted into a through hole 36e formed at the rear end 36b of the mount frame 36 (see FIGS. 15 and 16). Finally, a nut 51a is tightened to the rear end of the stopper 51 inserted into the through hole 36e (see FIG. 17). In this manner, the electromagnetic clutch 50 (specifically, the clutch case 50a) and the mount frame 36 are joined to each other via the stopper 51, thus restricting the rotation of the clutch case 50a.

Next, explanation will be made on a method for detaching the engine 8 from the work vehicle 1 having the above-described configuration.

In the case where the engine 8 is detached from the work vehicle 1, the nut 51a (see FIG. 17) is loosened to release the stopper 51 from the rear end 36b. Moreover, the belt 66 (see FIG. 13) is undone from the first pulley 46. Furthermore, the belt 76 is undone from the second pulley 48. Additionally, the hose and the like connected to the engine 8 are detached.

Figure 9:
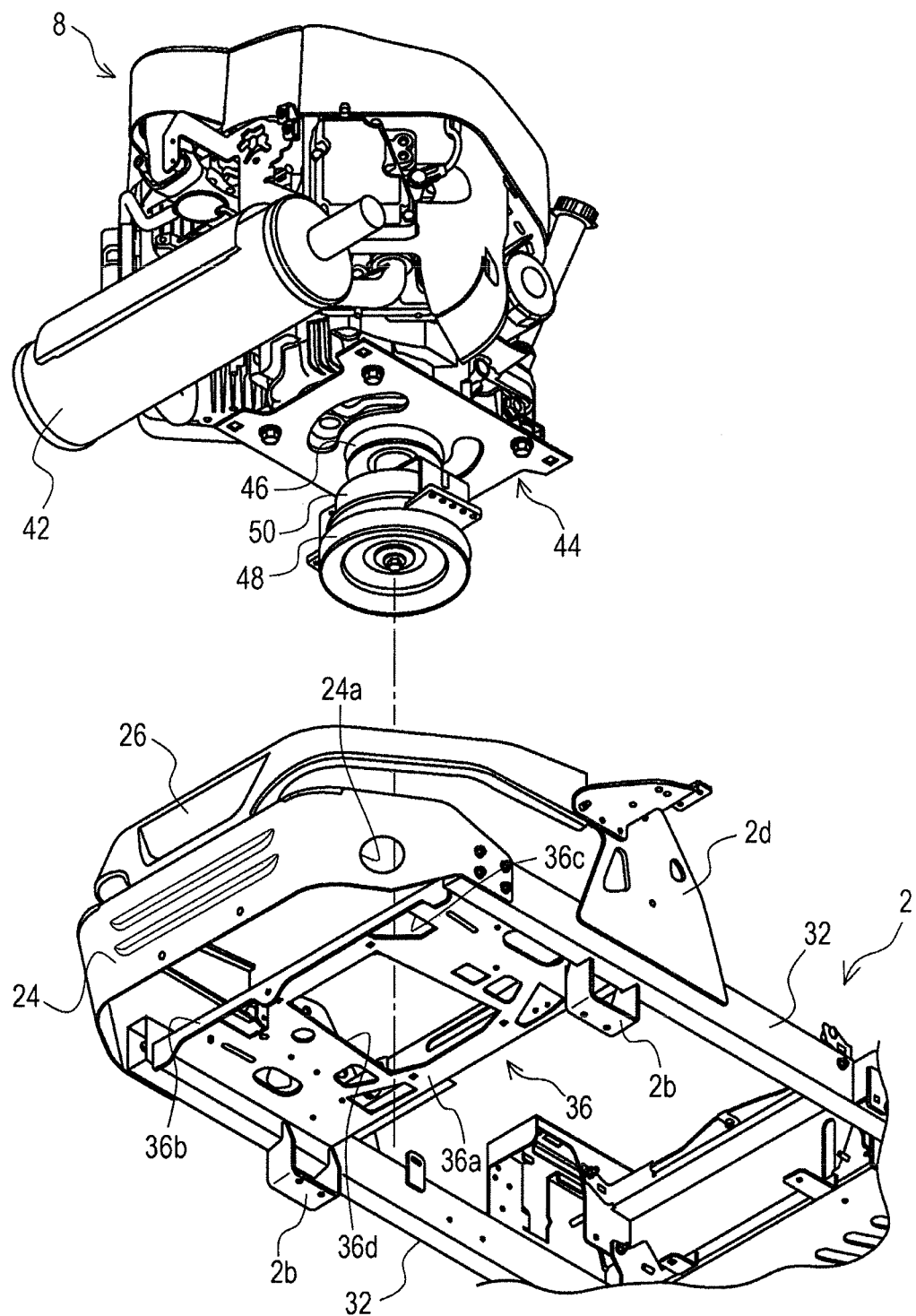
FIG. 9 is an exploded perspective view showing the engine and the machine frame, as viewed from the downward and rearward.
Figure 10:
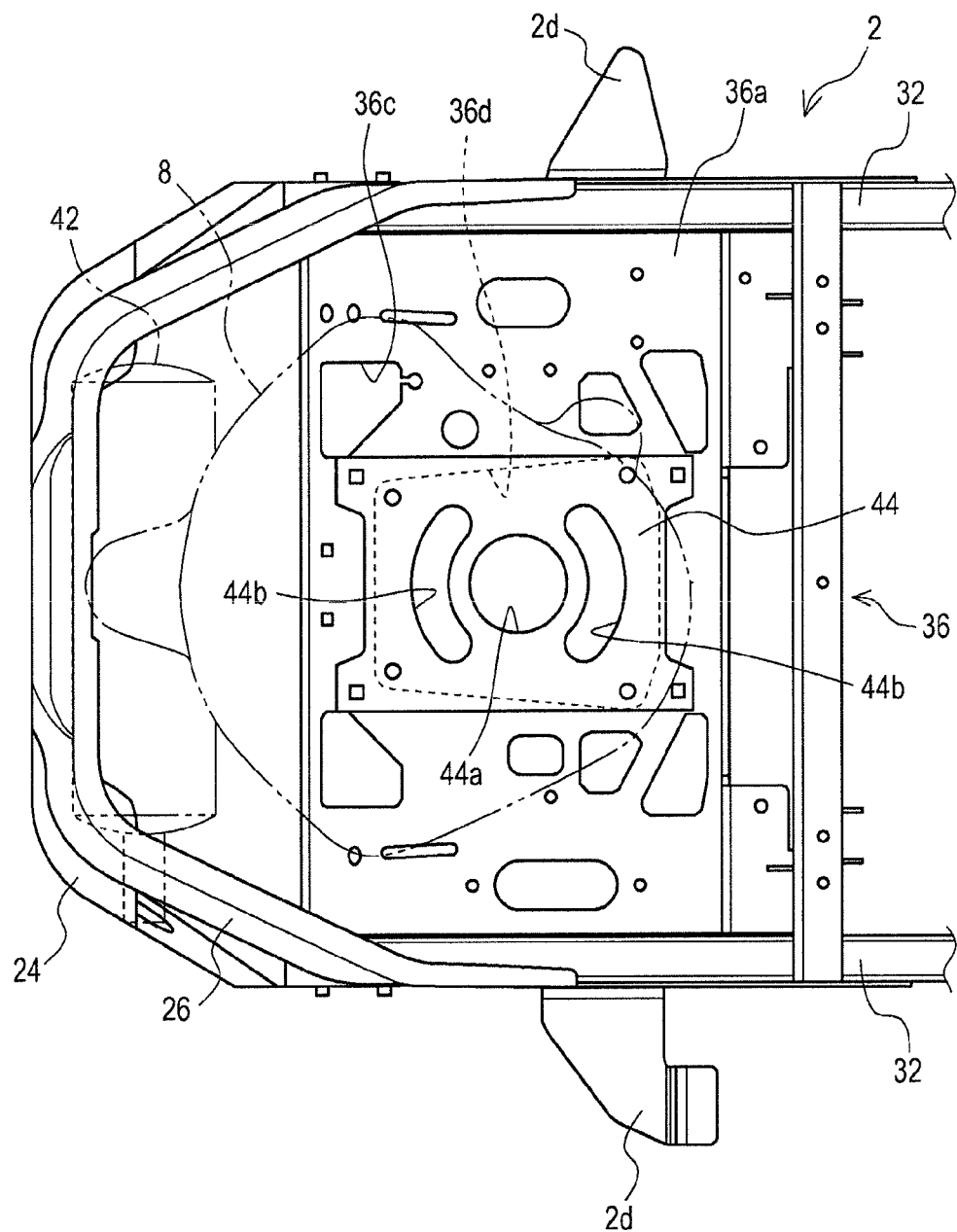
FIG. 10 is a plan view showing the machine frame in the state in which a fixed plate is fixed.

Subsequently, the bolt and the like for fixing the fixed plate 44 onto the mount surface 36a are loosened. In this state, the engine 8 is lifted upward. As shown in FIG. 7, the upper portion of the muffler 42 is not completely covered with the muffler cover 24 and the engine cover 26. As a consequence, the engine 8 can be detached from the machine frame 2 (i.e., the mount surface 36a) as the muffler 42 is kept to be fixed to the engine 8, as shown in FIG. 9. Here, the size of the opening 36d formed at the mount surface 36a is greater than the first pulley 46, the second pulley 48, and the electromagnetic clutch 50, as viewed on the plane. Thus, the engine 8 can be detached from the machine frame 2 without detaching the first pulley 46, the second pulley 48, and the electromagnetic clutch 50 from the output shaft 8a.

In contrast, in the case where the engine 8 is attached to the work vehicle 1 (i.e., the machine frame 2) again, the engine 8 is mounted on the mount surface 36a of the machine frame 2 from above in the state in which the muffler 42, the fixed plate 44, the first pulley 46, the second pulley 48, and the electromagnetic clutch 50 are fitted to the engine 8. At this time, the first pulley 46, the second pulley 48, and the electromagnetic clutch 50 are inserted into the opening 36d formed at the mount surface 36a. And then, the fixed plate 44 is fixed onto the mount surface 36a via bolts or the like.

In this manner, the engine 8 can be readily attached to and detached from the machine frame 2 in the state in which the muffler 42, the fixed plate 44, the first pulley 46, the second pulley 48, and the electromagnetic clutch 50 are fitted to the engine 8. Consequently, it is possible to easily maintain the engine 8 and the like.

With this configuration in the present preferred embodiment, the mount frame 36 mounting the engine 8 thereon per se does not need to be detached. Therefore, even in the case where the other members (such as the canister 22 and the transmission 18) are fixed onto the mount frame 36, the engine 8 can be attached or detached without detaching the other members. Thus, the configuration in the present preferred embodiment is particularly effective when the other members are fixed onto the mount frame 36.

The shape of the opening 36d formed at the mount surface 36a and the shape of the fixed plate 44 are not limited to those shown in the present preferred embodiment. For example, the opening 36d and the fixed plate 44 may be formed into a circular shape, as viewed on the plane.

Moreover, the engine 8 may be designed to be fixed directly onto the mount surface 36a without using any fixed plate 44.

Additionally, a member (such as a battery) other than the engine 8, the transmission 18, and the canister 22 may be fixed onto the mount surface 36a.

In addition, the second pulley 48 may be disposed above the first pulley 46.

Industrial Applicability

The present invention is applicable to the work vehicle provided with the engine that is mounted on the mount surface and has the output shaft projecting downward from the mount surface.

What is claimed is:

1. A ride-on work vehicle comprising:
   an engine in which a plurality of pulleys for transmitting power are fitted to an output shaft disposed in such a manner as to project downward from a bottom;
   a mount surface comprising an opening into which the plurality of pulleys can be inserted;
   the engine being mounted on the mount surface with the plurality of pulleys inserted into the opening from above;
   said opening into which the plurality of pulleys can be inserted being sized to allow removal of the engine with said pulleys fitted to the output shaft;
   a mower unit disposed forward of the engine; and
   a rotatable drive wheel,
   wherein the power of the engine is transmitted to the mower unit via at least one of the plurality of pulleys, and further, is transmitted to the drive wheel via at least one of the plurality of pulleys.

2. The work vehicle according to claim 1, further comprising:
   a fixed plate that is mounted on the mount surface and secured to the bottom of the engine.

3. The work vehicle according to claim 2, wherein the output shaft is inserted through the fixed plate, the fixed plate being interposed between the bottom of the engine and the pulleys.

4. The work vehicle according to claim 3, wherein an electromagnetic clutch for switching the transmission of the power to at least one of the plurality of pulleys is fitted to the output shaft, the opening allowing the electromagnetic clutch to pass therethrough.

5. The work vehicle according to claim 3, wherein the fixed plate is disposed in such a manner as to close the opening formed at the mount surface when the fixed plate is joined to the mount surface.

6. The work vehicle according to claim 3, further comprising:
a muffler fixed to the engine in such a manner that at least a part thereof overlaps the engine, as viewed on a plane.

7. The work vehicle according to claim 6, wherein the muffler is disposed at the same height as a machine frame including the mount surface.

8. The work vehicle according to claim 7, further comprising:
a muffler cover fixed to the machine frame so as to cover the muffler sideways.

9. A work vehicle comprising:
a driver seat;
an engine arranged behind the driver seat;
a pulley for transmitting power being fitted to an output shaft of the engine;
said output shaft being disposed in such a manner as to project downward from a bottom of the engine; and
a machine frame including:
a pair of right and left main frames extending lengthwise; and
a mount surface, which is fixed to the pair of right and left main frames in such a manner as not to be freely attached thereto or detached therefrom so as to join the pair of right and left main frames to each other, and at which an opening, into which the pulley can be inserted, is formed, and further, on which the engine is mounted in the state in which the pulley is inserted into the opening from above,
wherein the opening into which the pulley can be inserted is sized to allow removal of the engine with said pulley fitted to the output shaft.

10. The work vehicle according to claim 9, further comprising:
a fixed plate mounted on the mount surface and the bottom of the engine being mounted on the fixed plate.

11. The work vehicle according to claim 10, wherein the output shaft is inserted through the fixed plate, the fixed plate being interposed between the bottom of the engine and the pulleys.

12. The work vehicle according to claim 11, further comprising:
a muffler fixed to the engine in such a manner that at least a part thereof overlaps the engine, as viewed on a plane, and further, is arranged at the same height as that of the main frames.

13. The work vehicle according to claim 12, further comprising: a muffler cover fixed to the main frames so as to cover the muffler sideways.

14. The work vehicle according to claim 9, further comprising:
a mower unit disposed forward of the engine;
wherein the power of the engine is transmitted to the mower unit via the pulley.

15. The work vehicle according to claim 9, further comprising:
a rotatable drive wheel;
wherein the power of the engine is transmitted to the drive wheel via the pulley.

16. A mower work vehicle comprising:
an engine having an output shaft;
at least one pulley mounted to the output shaft;
a main mounting surface arranged on a vehicle frame;
said main mounting surface comprising a main opening;
an engine mounting plate comprising:
openings for mounting the engine to the engine mounting plate; and
openings for mounting the engine mounting plate to the main mounting surface;
said main opening being sized to allow removal of the engine and the engine mounting plate while the at least one pulley remains mounted to the output shaft;
a mower unit arranged in front of the engine; and
at least one drive wheel;
wherein the engine is configured to power the mower unit and the at least one drive wheel.

17. The work vehicle according to claim 16, wherein the main mounting surface comprises mounting openings and the openings for mounting the engine mounting plate to the main mounting surface align with the mounting openings of the main mounting surface.

18. The work vehicle according to claim 16, further comprising a driver sear arranged in front of the engine.

19. The work vehicle according to claim 16, wherein the main mounting surface is an upper surface of a main mounting plate fixed to the vehicle frame.

20. The work vehicle according to claim 16, wherein:
the at least one drive wheel comprises two rear drive wheels;
the engine mounting plate comprises a main opening that is smaller in size than the pulley; and
a clutch and another pulley are mounted to the output shaft so as to be removable with the engine.

* * * * *